(12) United States Patent
Xiang et al.

(10) Patent No.: US 11,880,584 B2
(45) Date of Patent: Jan. 23, 2024

(54) REVERSE RANGE LOOKUP ON A UNIFIED LOGICAL MAP DATA STRUCTURE OF SNAPSHOTS

(71) Applicant: VMware LLC, Palo Alto, CA (US)

(72) Inventors: Enning Xiang, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/348,016

(22) Filed: Jun. 15, 2021

(65) Prior Publication Data

US 2022/0398030 A1    Dec. 15, 2022

(51) Int. Cl.
| | |
|---|---|
| *G06F 3/06* | (2006.01) |
| *G06F 9/455* | (2018.01) |
| *G06F 16/22* | (2019.01) |
| *G06F 16/245* | (2019.01) |
| *G06F 16/188* | (2019.01) |

(52) U.S. Cl.
CPC .......... *G06F 3/0655* (2013.01); *G06F 3/0604* (2013.01); *G06F 3/0679* (2013.01); *G06F 9/45558* (2013.01); *G06F 16/2246* (2019.01); *G06F 16/245* (2019.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 8,527,544 | B1* | 9/2013 | Colgrove | G06F 16/1748 707/791 |
| 2005/0066118 | A1* | 3/2005 | Perry | G06F 11/1469 711/112 |
| 2013/0250686 | A1* | 9/2013 | Marukame | G06F 3/0644 365/185.11 |
| 2014/0095535 | A1* | 4/2014 | Deshmukh | G06F 16/24539 707/769 |
| 2021/0342298 | A1* | 11/2021 | Mathews | G06F 16/128 |

OTHER PUBLICATIONS

Guanlin Lu; BloomStore: Bloom-Filter based Memory-efficient Key-Value Store for Indexing of Data Deduplication on Flash; IEEE; 2012; pp. 1-11 (Year: 2012).*

* cited by examiner

*Primary Examiner* — Albert M Phillips, III
*Assistant Examiner* — Jermaine A Mincey
(74) *Attorney, Agent, or Firm* — King Intellectual Asset Management

(57) ABSTRACT

A method for reverse range lookup in an ordered data structure of keys, wherein each key comprises a logical block address (LBA) and a snapshot identifier (ID) of one of one or more snapshots in a snapshot hierarchy, is provided. The keys in the ordered data structure are in an order from smallest to largest LBA, wherein in the order, keys having a same LBA are ordered from smallest to largest snapshot ID. The method includes determining a range of LBAs and traversing the ordered data structure in reverse order until a key is found that: has an LBA and a snapshot ID that is less than or equal to the last LBA and the largest snapshot ID, respectively. The method further includes adding an extent corresponding to the located key to an extent result list if the snapshot ID of the located key is not within a deny list.

18 Claims, 5 Drawing Sheets

REVERSE RANGE LOOKUP ON A UNIFIED LOGICAL MAP DATA STRUCTURE OF SNAPSHOTS

BACKGROUND

In the field of data storage, a storage area network (SAN) is a dedicated, independent high-speed network that interconnects and delivers shared pools of storage devices to multiple servers. A virtual SAN (VSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The VSAN architecture may be a two-tier datastore including a performance tier for the purpose of read caching and write buffering and a capacity tier for persistent storage.

The VSAN datastore may manage storage of virtual disks at a block granularity. For example, VSAN may be divided into a number of physical blocks (e.g., 4096 bytes or "4K" size blocks), each physical block having a corresponding physical block address (PBA) that indexes the physical block in storage. Physical blocks of the VSAN may be used to store blocks of data (also referred to as data blocks) used by VMs, which may be referenced by logical block addresses (LBAs). Each block of data may have an uncompressed size corresponding to a physical block. Blocks of data may be stored as compressed data or uncompressed data in the VSAN, such that there may or may not be a one to one correspondence between a physical block in VSAN and a data block referenced by an LBA.

Modern storage platforms, including VSAN datastore, may enable snapshot features for backup, archival, or data protections purposes. Snapshots provide the ability to capture a point-in-time state and data of a VM to not only allow data to be recovered in the event of failure but restored to known working points. Snapshots may not be stored as physical copies of all data blocks, but rather may entirely or in part be stored as pointers to the data blocks that existed when the snapshot was created.

Each snapshot may include its own snapshot metadata, e.g., mapping of LBAs mapped to PBAs, stored concurrently by several compute nodes (e.g., metadata servers). The snapshot metadata may be stored as key-value data structures to allow for scalable input/output (I/O) operations. In particular, a unified logical map B+ tree may be used to manage logical extents for the logical address to physical address mapping of each snapshot, where an extent is a specific number of contiguous data blocks allocated for storing information. A B+ tree is a multi-level data structure having a plurality of nodes, each node containing one or more key-value pairs stored as tuples (e.g., <key, value>). A key is an identifier of data and a value is either the data itself or a pointer to a location (e.g., in memory or on disk) of the data associated with the identifier.

A schema of the unified logical map B+ tree may include tuples of <LBA, snapshot identifier (ID), PBA, number of blocks> (and in some cases, <LBA, snapshot ID, physical sector address (PSA), number of blocks, number of sectors, compression size, etc.>), where the combination of LBA and snapshot ID is the key. Because a B+ tree may be sorted according to the keys of the tuples, the unified logical map B+ tree may be sorted according to LBA and snapshot ID. More specifically, the unified logical map B+ tree may be stored in a LBA first, snapshot ID second manner.

Data can be read from the tree based on the key (e.g., LBA) associated with the data; thus, efficient LBA lookup in the unified logical map B+ tree is critical to servicing client read requests. However, given the organization of keys in the unified logical map B+ tree, conventional lookup methods, such as linear scanning, may adversely impact I/O performance. For example, a read request for a range of LBAs, under the linear scan method, may require the system filter out logical extents in the unified logical map B+ tree that are not the most recent extent among extents with the same LBA address or that do not belong to snapshots in the snapshot chain of a running point (RP), which is a pointer to a root node of the B+ tree that is traversed for reads and writes that occur after the most recent snapshot was taken.

It should be noted that the information included in the Background section herein is simply meant to provide a reference for the discussion of certain embodiments in the Detailed Description. None of the information included in this Background should be considered as an admission of prior art.

DETAILED DESCRIPTION

Aspects of the present disclosure introduce a range lookup algorithm for a unified logical map B+ tree of snapshots. In particular, a workflow of the range lookup algorithm presented herein searches, in a B+ tree, for one or more logical block addresses (LBAs) of a range of LBAs beginning with the last LBA in the range and last snapshot ID in the system and searching in reverse through the B+ tree, and also referencing a deny list used to maintain a list of snapshots outside a chain of snapshots for a running point (RP). As used herein a RP may be a pointer to a root node of the B+ tree that is traversed for reads and writes that occur after the most recent snapshot was taken.

Reverse lookup of one or more extents for LBAs in the lookup range may allow for efficient location of qualified extents while avoiding finding and filtering out extents in the B+ tree that are not the latest extent. As used herein, qualifying extents may be extents associated with a key having an LBA in the query range of LBAs (including the maximum and minimum LBA in the range) and having a snapshot ID related to a snapshot in the snapshot chain of the RP. Additionally, referencing the deny list allows for effective skipping of extents associated with snapshots outside the snapshot chain of the RP when scanning the B+ tree. The reverse range lookup method utilizing a deny list delivers a performance-efficient range lookup algorithm for servicing one or more input/output (I/O) operations.

Though certain aspects described herein are described with respect to snapshot B+ trees, the aspects may be applicable to any suitable ordered data structure.

Figure 1:
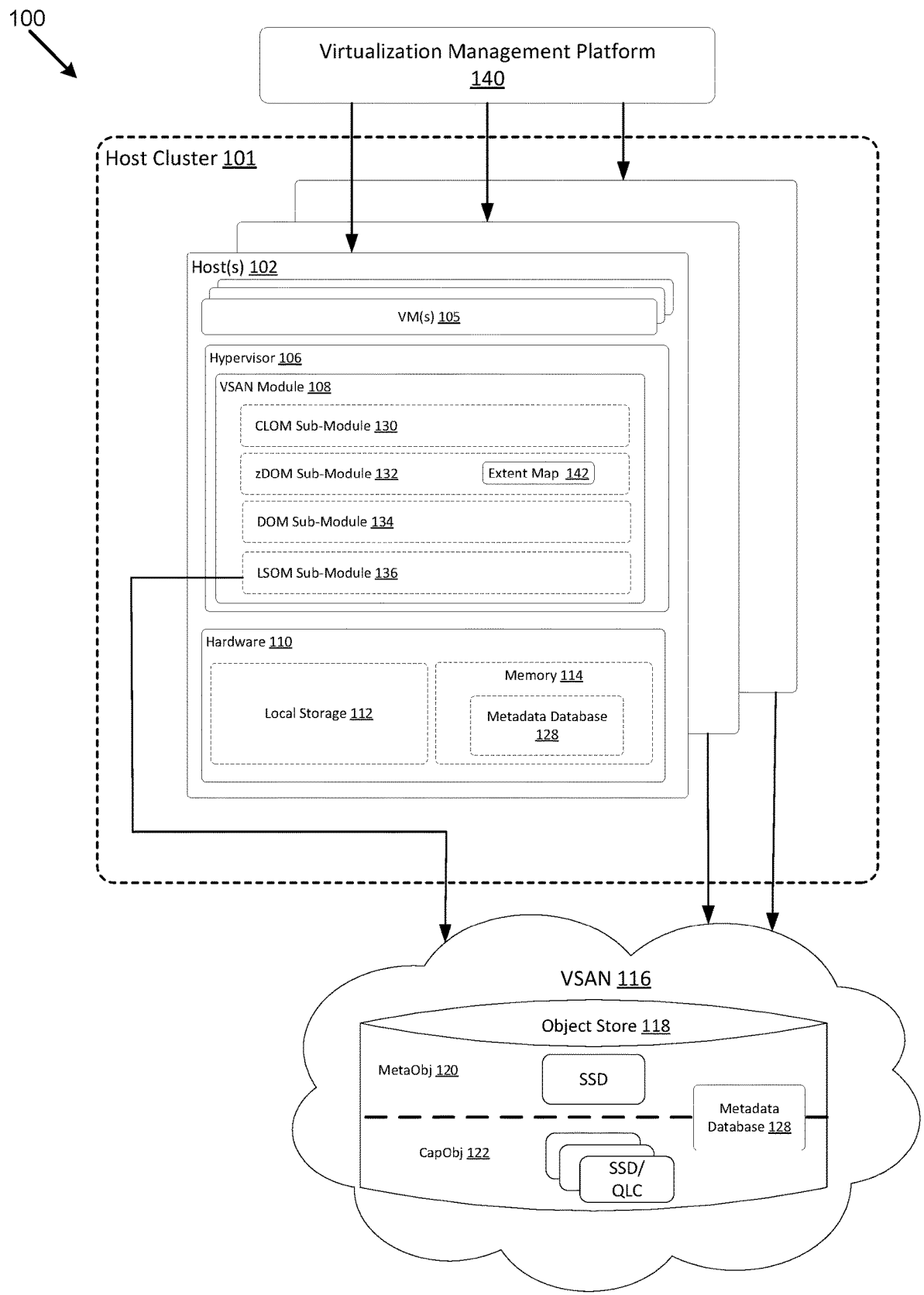
FIG. 1 is a diagram illustrating an example computing environment in which embodiments of the present application may be practiced.

FIG. 1 is a diagram illustrating an example computing environment 100 in which embodiments may be practiced. As shown, computing environment 100 may include a distributed object-based datastore, such as a software-based "virtual storage area network" (VSAN) environment, VSAN 116, that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of VSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, VSAN 116 is configured to store virtual disks of VMs 105 as data blocks in a number of physical blocks, each physical block having a physical block address (PBA) that indexes the physical block in storage. VSAN module 108 may create an "object" for a specified data block by backing it with physical storage resources of an object store 118 (e.g., based on a defined policy).

VSAN 116 may be a two-tier datastore, storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data.

Each host 102 may include a storage management module (referred to herein as a VSAN module 108) in order to automate storage management workflows (e.g., create objects in MetaObj 120 and CapObj 122 of VSAN 116, etc.) and provide access to objects (e.g., handle I/O operations to objects in MetaObj 120 and CapObj 122 of VSAN 116, etc.) based on predefined storage policies specified for objects in object store 118.

A virtualization management platform 140 is associated with host cluster 101. Virtualization management platform 140 enables an administrator to manage the configuration and spawning of VMs 105 on various hosts 102. As illustrated in FIG. 1, each host 102 includes a virtualization layer or hypervisor 106, a VSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Each hypervisor 106, through its corresponding VSAN module 108, provides access to storage resources located in hardware 110 (e.g., storage) for use as storage for virtual disks (or portions thereof) and other related files that may be accessed by any VM 105 residing in any of hosts 102 in host cluster 101.

VSAN module 108 may be implemented as a "VSAN" device driver within hypervisor 106. In such an embodiment, VSAN module 108 may provide access to a conceptual "VSAN" through which an administrator can create a number of top-level "device" or namespace objects that are backed by object store 118 of VSAN 116. By accessing application programming interfaces (APIs) exposed by VSAN module 108, hypervisor 106 may determine all the top-level file system objects (or other types of top-level device objects) currently residing in VSAN 116.

Each VSAN module 108 (through a cluster level object management or "CLOM" sub-module 130) may communicate with other VSAN modules 108 of other hosts 102 to create and maintain an in-memory metadata database 128 (e.g., maintained separately but in synchronized fashion in memory 114 of each host 102) that may contain metadata describing the locations, configurations, policies and relationships among the various objects stored in VSAN 116. Specifically, in-memory metadata database 128 may serve as a directory service that maintains a physical inventory of VSAN 116 environment, such as the various hosts 102, the storage resources in hosts 102 (e.g., SSD, NVMe drives, magnetic disks, etc.) housed therein, and the characteristics/capabilities thereof, the current state of hosts 102 and their corresponding storage resources, network paths among hosts 102, and the like. In-memory metadata database 128 may further provide a catalog of metadata for objects stored in MetaObj 120 and CapObj 122 of VSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by VSAN module 108 on host 102, for example, when a user (e.g., an administrator) first creates a virtual disk for VM 105 as well as when VM 105 is running and performing I/O operations (e.g., read or write) on the virtual disk.

VSAN module 108, by querying its local copy of in-memory metadata database 128, may be able to identify a particular file system object (e.g., a virtual machine file system (VMFS) file system object) stored in object store 118 that may store a descriptor file for the virtual disk. The descriptor file may include a reference to a virtual disk object that is separately stored in object store 118 of VSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by VSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host 102.

Various sub-modules of VSAN module 108, including, in some embodiments, CLOM sub-module 130, distributed object manager (DOM) sub-module 134, zDOM sub-module 132, and/or local storage object manager (LSOM) sub-module 136, handle different responsibilities. CLOM sub-module 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in object store 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. The storage policy may define attributes such as a failure tolerance, which defines the number of host and device failures that a VM can tolerate. A redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of VSAN 116 datastore. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). Including RAID 5 and RAID 6 configurations, each stripe may also include one or more parity blocks. Accordingly, CLOM sub-module 130, may be responsible for generating a virtual disk blueprint describing a RAID configuration.

CLOM sub-module 130 may communicate the blueprint to its corresponding DOM sub-module 134, for example, through zDOM sub-module 132. DOM sub-module 134 may interact with objects in VSAN 116 to implement the blueprint by allocating or otherwise mapping component objects of the virtual disk object to physical storage locations within various hosts 102 of host cluster 101. DOM sub-module 134 may also access in-memory metadata database 128 to determine the hosts 102 that store the component objects of a corresponding virtual disk object and the paths by which those hosts 102 are reachable in order to satisfy the I/O operation. Some or all of metadata database 128 (e.g., the mapping of the object to physical storage locations, etc.) may be stored with the virtual disk object in object store 118.

When handling an I/O operation from VM 105, due to the hierarchical nature of virtual disk objects in certain embodiments, DOM sub-module 134 may further communicate across the network (e.g., a local area network (LAN), or a wide area network (WAN)) with a different DOM sub-module 134 in a second host 102 (or hosts 102) that serves as the coordinator for the particular virtual disk object that is stored in local storage 112 of the second host 102 (or hosts 102) and which is the portion of the virtual disk that is subject to the I/O operation. If VM 105 issuing the I/O operation resides on a host 102 that is also different from the coordinator of the virtual disk object, DOM sub-module 134 of host 102 running VM 105 may also communicate across the network (e.g., LAN or WAN) with the DOM sub-module 134 of the coordinator. DOM sub-modules 134 may also similarly communicate amongst one another during object creation (and/or modification).

Each DOM sub-module 134 may create their respective objects, allocate local storage 112 to such objects, and advertise their objects in order to update in-memory metadata database 128 with metadata regarding the object. In order to perform such operations, DOM sub-module 134 may interact with a local storage object manager (LSOM) sub-module 136 that serves as the component in VSAN module 108 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested.

zDOM sub-module 132 may be responsible for caching received data in the performance tier of VSAN 116 (e.g., as a virtual disk object in MetaObj 120) and writing the cached data as full stripes on one or more disks (e.g., as virtual disk objects in CapObj 122). To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance. For example, zDOM sub-module 132 may do this full stripe writing to minimize a write amplification effect. Write amplification, refers to the phenomenon that occurs in, for example, SSDs, in which the amount of data written to the memory device is greater than the amount of information you requested to be stored by host 102. Write amplification may differ in different types of writes. Lower write amplification may increase performance and lifespan of an SSD.

In some embodiments, zDOM sub-module 132 also performs other datastore procedures, such as data compression and hash calculation, which may result in substantial improvements, for example, in garbage collection, deduplication, snapshotting, etc. (some of which may be performed locally by LSOM sub-module 136 of FIG. 1).

zDOM sub-module 132 may also store and access an extent map 142. Extent map 142 provides a mapping of LBAs to PBAs. Each physical block having a corresponding PBA in one or more stripes may be referenced by one or more LBAs. For each LBA, VSAN module 108, may store in a logical map, at least a corresponding PBA. The logical map may include an LBA to PBA mapping table. For example, the logical map be a B+ tree. As described above, the logical map may store tuples of <LBA, PBA>, <LBA, PBA, number of blocks>, or if the data is compressed, <LBA, physical sector address (PSA), number of sectors, compression size>. As an illustrative example, data written to a block corresponding to PBA1 in a first stripe may be referenced by LBA2. Thus, the logical map may store a tuple of <LBA2, PBA1>. Similar tuples may be stored in the logical map for other LBAs. According to the information stored in the logical map, VSAN module 108 may use the logical map to determine which PBA is referenced by an LBA.

The contents of the logical map may be updated to add new tuple entries associated with LBAs not previously stored within the logical map. The content of the logical map may also be updated to indicate proper disk locations when data in a first block corresponding to a first PBA is moved to a second block corresponding to a second PBA (e.g., when flushing data (e.g., in full stripes) in a second object (e.g., CapObj 122) in the capacity tier of VSAN 116, as a result of segment cleaning, etc.).

Logical maps may also be used in snapshot mapping architecture. Modern storage platforms, including VSAN 116, may enable snapshot features for backup, archival, or data protections purposes. Snapshots provide the ability to capture a point-in-time state and data of a VM 105 to not only allow data to be recovered in the event of failure but restored to known working points. Snapshots may capture VMs' 105 storage, memory, and other devices, such as virtual network interface cards (NICs), at a given point in time. Snapshots do not require an initial copy, as they are not stored as physical copies of data blocks (at least initially), but rather as pointers to the data blocks that existed when the snapshot was created. Because of this physical relationship, a snapshot may be maintained on the same storage array as the original data.

Each snapshot may include its own logical map. Where a logical map has not been updated from the time a first snapshot was taken to a time a subsequent snapshot was taken, snapshot logical maps may include identical tuples for the same LBA. As more snapshots are accumulated over time (i.e., increasing the number of snapshot logical maps), the number of references to the same PBA extent may increase. Additionally, the number of entries within each logical map may increase over time.

Figure 2:
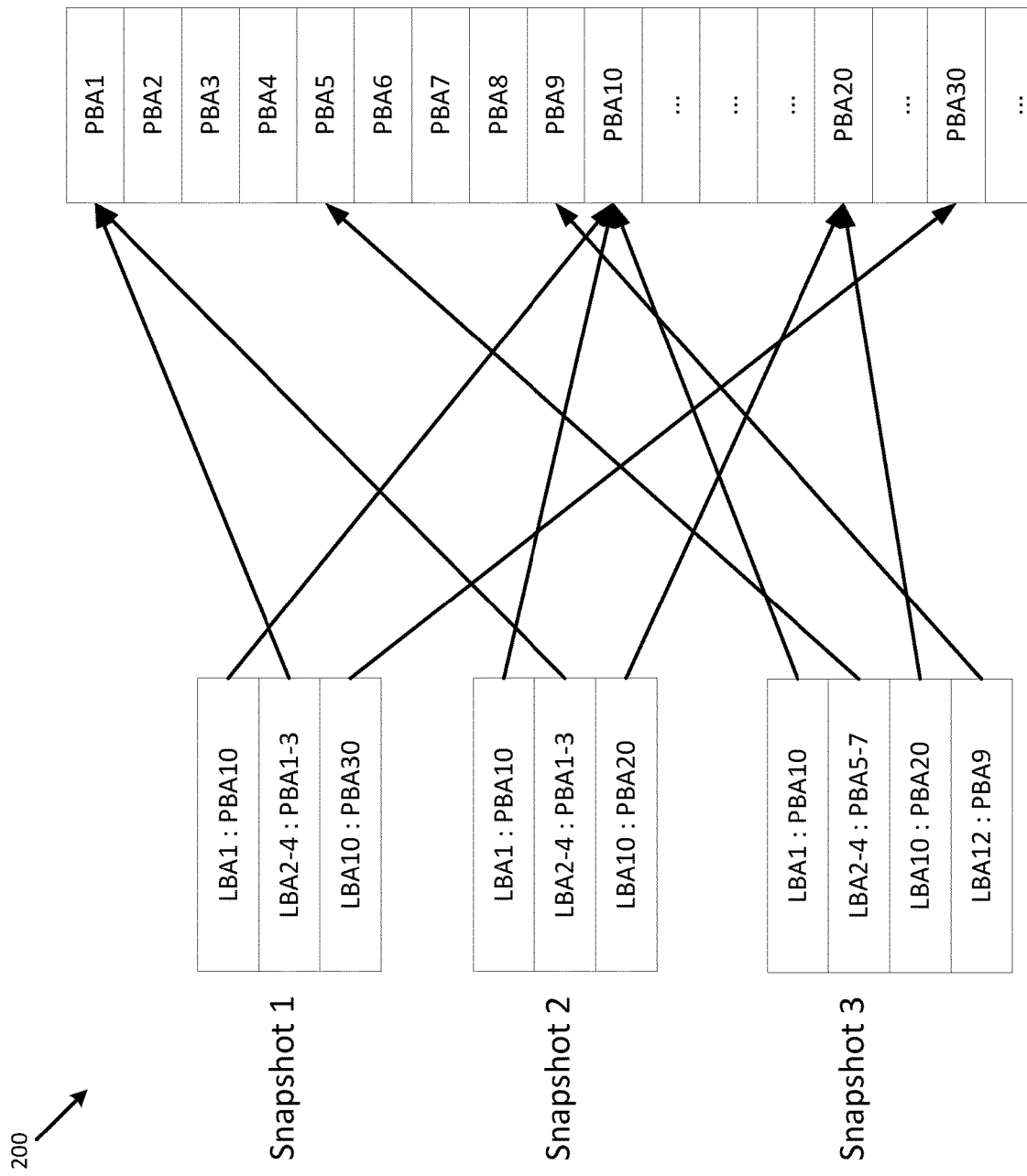
FIG. 2 is a diagram illustrating example snapshot extent mapping architecture, according to an example embodiment of the present disclosure.

FIG. 2 is a diagram illustrating example snapshot extent mapping architecture, 200 according to an example embodiment of the present disclosure. As shown in FIG. 2, the extent map 142 may map LBAs to one or more PBAs for three snapshots, snapshots 1, 2, and 3. The extent map 142 may be stored within in-memory metadata database 128 (as shown in FIG. 1 and described herein) as well as in persistent storage in object store 118.

The snapshot extent mapping architecture may include a snapshot logical map. The schema of the snapshot logical map may store at least a two-tuple key <LBA, snapshot identifier (ID)> to a two-tuple value <PBA, numBlocks>. In some embodiments, other tuple values, such as a PSA of a sector (e.g., each sector being 512-byte) of a physical block where blocks are compressed prior to storage, number of sectors, compression size, cyclic redundancy check (CRC), etc. may also (or alternatively) be stored in the snapshot logical map. Value "numBlocks" may indicate a number of uncompressed contiguous physical blocks for which the data is stored within.

In the example of FIG. 2, snapshot 1 contains three tuples, mapping LBA1 to PBA10, LBA2-4 to PBA1-3, and LBA10 to PBA30. In snapshot 2 (e.g., a snapshot taken an amount of time after taking snapshot 1), the tuples for LBA1 and LBA2-4 remain the same compared to snapshot 1; however, data block content corresponding to LBA10 at PBA30 is overwritten and new data block corresponding to LBA10 is written to PBA20. Accordingly, the logical map includes LBA10 mapping to PBA20, instead of PBA30 as in snapshot 1. For snapshot 3 (e.g., a snapshot taken an amount of time after taking snapshot 2), the tuples for LBA1 and LBA10 remain the same compared to snapshot 2; however, data block content corresponding to LBA2-4 is moved from PBA1-3 to PBAS-7 and new data block content referenced by LBA12 is written to a physical block corresponding to PBA9. Accordingly, the logical map includes LBA2-4 mapping to PBAS-7, instead of PBA1-3 as in snapshots 1 and 2. Additionally, mapping of LBA12 to PBA9 is added to the logical map of snapshot 3. In this example, snapshot 3 is a child of snapshot 2, and snapshot 2 is a child of snapshot 1.

As discussed above, a unified logical map B+ tree may be used to manage logical extents for the logical address to physical address mapping of all snapshots. The B+ tree may store tuples of <LBA, snapshot ID, PBA, number of blocks> (and in some cases, <LBA, snapshot ID, physical sector address (PSA), number of blocks, number of sectors, compression size, etc.>), where the combination of LBA and snapshot ID is the key. The B+ tree may be sorted in an LBA first, snapshot ID second manner. Accordingly, for the example snapshot extent mapping architecture 200 illustrated in FIG. 2, this means the first logical map extent in the unified logical map B+ tree is [LBA1:Snapshot ID 1 (S1)] and the last logical map extent is [LBA12:Snapshot ID (S3)], given LBA1 and S1 are the smallest LBA and earliest snapshot ID, respectively, while LBA12 and S3 are the largest LBA and latest snapshot ID, respectively.

Because the unified logical map B+ tree contains sorted tuples, a read operation such as a scan or a query to the B+ tree may be completed by traversing the B+ tree to read the desired tuple, or the desired range of tuples, based on the corresponding key or starting key. Conventionally, a B+ tree range lookup includes locating the first qualified extent of the given range in the B+ tree and then linearly scanning the B+ tree until the last qualified extent is located (e.g., reached). For example, a read I/O may request a range of LBAs. As described herein, "qualified extents" may be extents associated with a key having an LBA in the query range of LBAs (including the maximum and minimum LBA in the range) and having a snapshot ID related to a snapshot in the snapshot chain of the RP. The returned extents from the range lookup may be a subset of (e.g., equal to or smaller than) extents corresponding to the desired query range of LBAs.

The unified logical map B+ tree may contain extents with the same LBA but different snapshot IDs. In the example snapshot extent mapping architecture 200 illustrated in FIG. 2, the logical map B+ tree includes [LBA1:S1], [LBA1:S2], [LBA1:S3], etc. Thus, under the conventional linear scan method, extents that are not the latest extent among those with the same LBA are filtered out. For example, a read request I/O that includes LBA1 in the query range would first find [LBA1:S1], then [LBA1:S2], and then [LBA1:S3], and extents [LBA1:S1] and [LBA1:S2] would be filtered out to return only [LBA1:S3].

Snapshots outside the snapshot chain of the RP may include snapshots not within the child-to-parent snapshot relation of the RP. A new RP may be created from any previous snapshot, and that previous snapshot may become the parent snapshot of the RP. In the example snapshot extent mapping architecture 200 illustrated in FIG. 2, snapshot 3 may be the RP and is the child of snapshot 2, and snapshot 2 is the child of snapshot 1. If the RP is not created from the latest snapshot, a new snapshot chain is created. The process of creating a RP from a previous snapshot may be referred to herein as a revert operation. Thus, revert operations may cause one or more snapshots to fall outside the snapshot chain of the RP. In the example snapshot extent mapping architecture 200 illustrated in FIG. 2, if the system reverts to snapshot 1 as the RP, when a new snapshot is created, the new snapshot will be the child of snapshot 1, but will be outside the chain of snapshot 2 and snapshot 3. In the conventional linear scan method, extents that don't belong to snapshots in the snapshot chain of the RP are also filtered out to locate one or more qualified extents.

Accordingly, the performance of this range lookup method may be suboptimal. In addition, in the snapshot mapping architecture where the RP has many ancestor snapshots or the system has some snapshots that branch out from the snapshot chain of the RP, further filtering may be performed, thereby adversely impacting performance for servicing the read request.

Aspects of the present disclosure introduce a range lookup algorithm for a unified logical map B+ tree of snapshots. In particular, a workflow of the range lookup algorithm presented herein may search for one or more LBAs of a range of LBAs beginning with the last LBA in the range in the last system snapshot and referencing a deny list used to maintain a list of snapshots outside a chain of snapshots for a RP.

As described herein, to create a new snapshot, a new RP may be created. The previous RP may become a read-only snapshot, also referred to as the parent snapshot of the new RP. Accordingly, as new RPs are created, the snapshot hierarchy may include one or more ancestor snapshots branching out from one or more snapshots. According to certain aspects, such branches of snapshots may be maintained in a deny list specific to each RP. As the RP changes, the deny list may also change.

As used herein, a deny list may include a list of snapshots outside a snapshot chain of the RP. A snapshot may become a snapshot outside a snapshot chain of the RP when the new RP is created from a previous snapshot that is not the most recently created snapshot in the snapshot chain. All snapshots subsequent to the newly identified parent snapshot of the RP may be considered outside the snapshot chain of the new RP and may be maintained in the deny list. In some embodiments, the deny list may compress snapshots with contiguous snapshots IDs into one snapshot range extent, also referred to herein as a deny list extent. In such a case, the deny list may contain one or multiple deny list extents, instead of listing all such snapshots outside the snapshot chain of the RP, thereby creating a space-efficient solution for performing reverse range lookup in an ordered data structure.

Figure 3A:
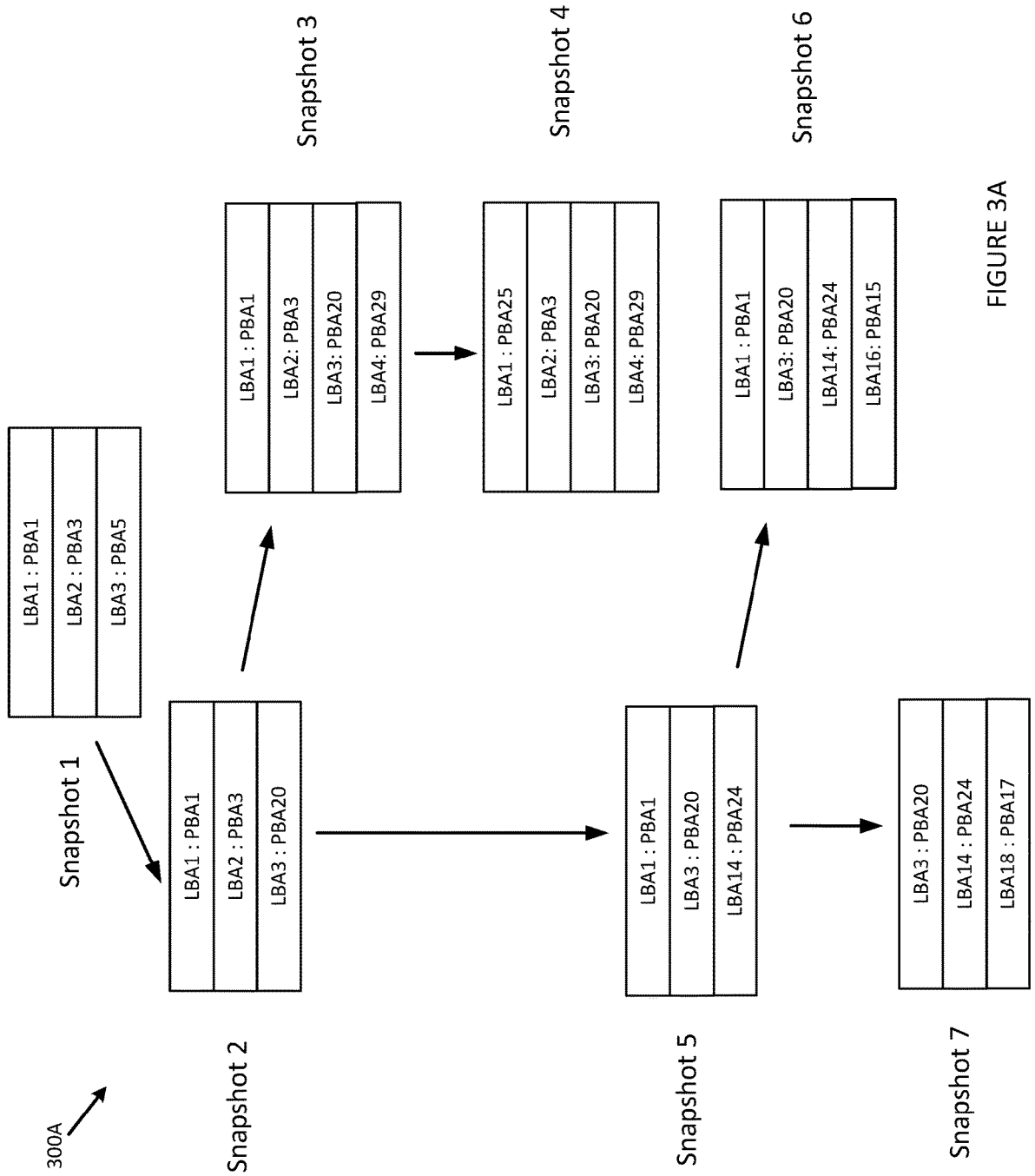
FIGS. 3A and 3B illustrate an example procedure and output for a reverse B+ tree range lookup on a unified logical map of snapshots, according to an example embodiment of the present disclosure.
Figure 3B:

FIGS. 3A and 3B illustrate an example procedure and output for a reverse B+ tree range lookup on a unified logical map of snapshots, according to an example embodiment of the present disclosure. In the example in FIG. 3A, zDOM sub-module 132 may receive and serve a read request with a query range [LBA2, LBA5], where LBA2 is the minimum LBA (e.g., start LBA) and LBA5 is the maximum LBA (e.g., last LBA).

In the example in FIG. 3A, a snapshot mapping hierarchy 300A includes seven snapshots. Snapshot 2 is a child of snapshot 1, snapshot 3 is a child of snapshot 2, and snapshot 4 is child of snapshot 3. Snapshot 5 was created by reverting the RP, at that time, to snapshot 2 and is a child of snapshot 2 in a new chain. Snapshot 6 is a child of snapshot 5. Snapshot 7 is created by reverting the RP back to snapshot 5 and is a child of snapshot 2 in a third chain. Accordingly, snapshot 7 may be considered the RP. By reverting back to snapshot 5 in the creation of snapshot 7, snapshot 6 is outside the snapshot chain of snapshot 7 and added to the deny list for snapshot 7. Additionally, because parent snapshot 5 was created by reverting to snapshot 2 at a previous time, snapshot 3 and snapshot 4 are outside the snapshot chain of snapshot 7 and added to the deny list for snapshot 7. Thus, in the example illustrated in FIG. 3A, snapshots within the snapshot chain of the RP (e.g., snapshot 7) include snapshot 5, snapshot 2, and snapshot 1, and snapshots within the deny list of the RP include snapshot 3, snapshot 4, and snapshot 6. Snapshot 3 and snapshot 4 are compressed into a single deny list extent given their corresponding snapshot IDs (e.g., snapshot ID 3 (S3) and snapshot ID 4 (S4), respectively) are contiguous. As shown in FIG. 3B, the deny list of the RP includes two extents, [S3, S4] and [S6], where S6 is the snapshot ID corresponding to snapshot 6.

As described herein, the unified logical map B+ tree corresponding to snapshot mapping hierarchy 300A may be sorted according to keys, e.g., LBA and snapshot ID, in an LBA first, snapshot ID second manner. FIG. 3B illustrates the organization of the B+ tree for snapshot mapping hierarchy 300A. As shown, the first entry in the logical map B+ tree may be [LBA1, S1] with [LBA1, S2], [LBA1, S3], [LBA1, S4], [LBA1, S5], and [LBA1, S6] following in sequential order. For this example, a tuple associated with LBA1 may not exist within snapshot 7 (e.g., due to deletion of a file); therefore, an entry (e.g., key) for [LBA1, S7] may not be present in the logical map B+ tree. Keys for LBA2, LBA3, LBA4, LBA14, LBA16, and LBA18 may follow in sequence in a similar manner as keys for LBA1. While organization of keys of the logical map B+ tree is shown in multiple columns and rows as an array for ease of explanation, one of ordinary skill in the art will understand that this is not reflective of the actual structure of a B+ tree. Further, this representation further illustrates that any suitable structure may be used and not just a B+ tree.

The reverse B+ tree range lookup on the unified logical map may begin by first setting a cursor for lookup to <last LBA, last Snapshot ID>, which may also be referred to herein as the composite key. The last LBA is the ending LBA inclusive in the lookup range. The last snapshot ID is the largest snapshot ID in the snapshot hierarchy (e.g., the snapshot ID of the RP). As such, for the example illustrated in FIG. 3A, the cursor may be set to <LBA15, S7>. The lookup may use the cursor to traverse the B+ tree in reverse order to find the first qualifying key in the B+ tree less than or equal to the composite key. For example, the scan may skip [LBA18, S7] and [LBA16, S6] as those keys are greater than the composite key and identify the first key as [LBA14, S7].

The deny list of the RP is checked for the snapshot ID of the returned extent. In the illustrated example, because S7 is not within the deny list containing [S3, S4] and [S6], the returned extent [LBA14, S7] is added to the extent result list. The lookup continues by resetting the cursor for lookup. In particular, the cursor may be reset to <LBA of returned extent−1, last Snapshot ID> when the prior returned extent was an extent added to the extent result list. In the illustrated example, because the extent corresponding to key [LBA14, S7] was added to the extent result list, the cursor may be reset to <LBA13, S7>.

If the first value of the reset cursor, e.g., LBA13, is less than the start LBA of the query range, then the range lookup is completed. If the first value of the reset cursor is greater than or equal to the start LBA of the query range, then the range lookup continues. In the illustrated example, because LBA13 is greater than the start LBA of the query range, LBA2, the lookup continues traversing the B+ tree in reverse order to locate the next qualifying key.

The lookup continues to scan the B+ tree to find a next qualifying key in the B+ tree less than or equal to the reset cursor of <LBA13, S7>. In the illustrated example, the scan identifies the next qualifying key as [LB4, S4]. However, because S4 is within the deny list, the returned extent corresponding to [LBA4, S4] is not added to the extent result list. Additionally, the deny list extent that contains the snapshot ID of the returned extent from the snapshot deny list may be retrieved to determine whether other snapshots having the same LBA may be skipped. In the illustrated example, deny list extent [S3, S4] may be retrieved from the deny list. Because the deny list extent also contains snapshot 3, snapshot 3 is skipped (e.g., [LBA4, S3]). The cursor is reset to <ending LBA of the returned qualifying extent, starting snapshot ID of the returned deny list extent−1>. In the illustrated example, the cursor is set to <LBA4, S2>.

Reset of the cursor to <LBA4, S2> results in skipping snapshot 3, and more specifically, skipping [LBA4, S3]. Extents related to other snapshots within the deny list but not part of the same deny list extent may not be skipped. For example, while the deny list includes extents [LBA4, S3], [LBA4, S4], and [LBA3, S6], only [LBA4, S3] and [LBA4, S4] are associated with deny list extent [S3, S4]; therefore, when [LBA4, S4] is located while traversing the B+ tree and deny list extent [S3, S4] is retrieved, only [LBA4, S3] may be skipped at the same time as [LBA4, S4] and not [LBA3, S6].

Because the first value of the reset cursor, LBA4, is greater than the starting LBA of the query range, LBA2, the lookup continues by traversing the B+ tree in reverse order to locate a qualifying key. In the illustrated example, traversing the B+ tree identifies the next qualifying key as [LBA3, S7]. Because S7 is not within the deny list, the returned extent is added to the extent result list. The cursor is then reset to <LBA of returned extent−1, last Snapshot ID>, in this example, <LBA2, S7>. Because the first value of the reset cursor, LBA2, is equal to the start LBA of the query range, LBA2, the lookup continues traversing the B+ tree in reverse order to locate a next qualifying key.

In this example, traversing the B+ tree identifies another qualifying key as [LBA2, S4]. Because S4 is within the deny list, the returned extent is not added to the extent result list. The cursor is reset to <LBA, S2>, to skip the other snapshots in the deny list extent [S3, S4]. In the illustrated example, the extent related to key [LBA2, S3] is skipped. Because the first value of the reset cursor, LBA2, is equal to the start LBA of the query range, LBA2, the lookup continues by traversing the B+ tree in reverse order to locate another qualifying key less than or equal to the reset cursor of <LBA2, S2>.

In the illustrated example, the scan identifies the qualifying key [LBA2, S2]. Because S2 is not within the deny list, the returned extent is added to the extent result list. The cursor is reset to <LBA of returned extent−1, last Snapshot ID>, and more specifically, <LBA1, S7>. Because the first value of the reset cursor, LBA1, is less than the start LBA of the query range, LBA2, the range lookup method is complete. All qualified extents are considered to have been located. In the example illustrated in FIGS. 3A and 3B, the lookup for the query range [LBA2, LBA15] for the snapshot mapping hierarchy 300A returns extents associated with keys [LBA14, S7], [LBA3, S7], and [LBA2, S2].

Figure 4:
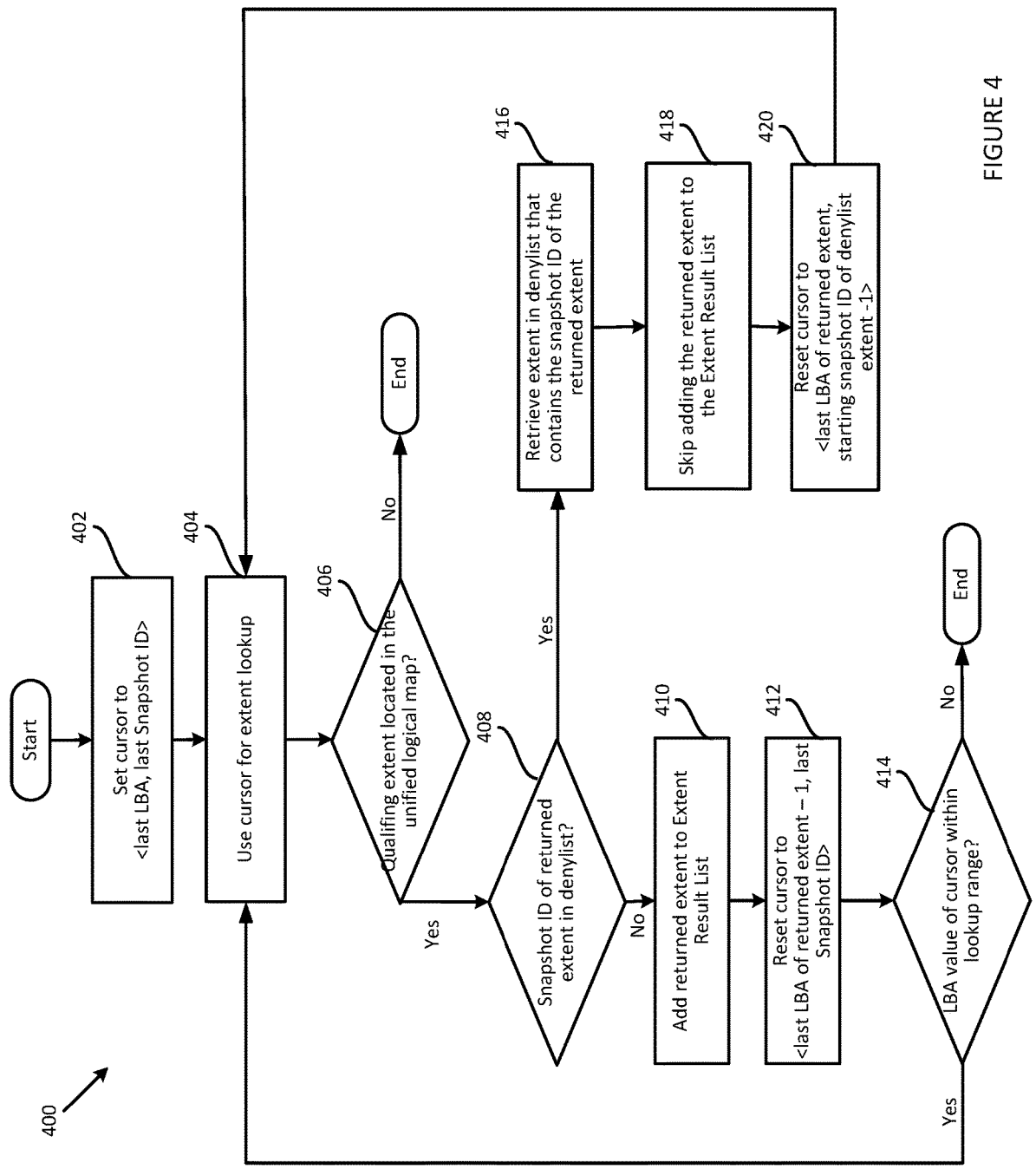
FIG. 4 depicts an example of a workflow for reverse range lookup in an ordered data structure, according to an example embodiment of the present application.

FIG. 4 depicts an example of a workflow 400 for reverse range lookup in an ordered data structure, according to an example embodiment of the present application. The workflow 400 may be performed by a module such as VSAN module 108. In some other embodiments, the workflow may be performed by other modules that reside in hypervisor 106 or outside of hypervisor 106.

Workflow 400 may start, at 402, by first setting a cursor for lookup to <last LBA, last Snapshot ID> where the last LBA is the ending LBA, inclusive in a query range and the last snapshot ID is the largest snapshot ID in the snapshot hierarchy (e.g., the snapshot ID of the RP). This initial cursor value may be referred to herein as the composite key. At 404, the cursor may be used to locate one or more qualified extents for the query range (e.g., LBAs ranging from a start LBA to a last LBA) in a unified logical map B+ tree. According to certain aspects, locating a first qualified extent may include scanning/traversing reversely through the B+ tree for a first extent whose key is equal to or less than the composite key.

At 406, if an extent equal to or less than the composite key is not located in the unified logical map B+ tree, then workflow 400 may end. If an extent is not located in a first iteration of workflow 400, then workflow 400 may return a NULL data set indicating that no extents in the unified logical map B+ tree match the searched criteria.

Alternatively, at 406, if an extent equal to or less than the composite key is located in the unified logical map B+ tree, then at 408, workflow 400 determines whether the snapshot ID of the returned extent is within the deny list for the RP. If, at 408, the snapshot ID of the returned extent is not within the deny list, then at 410, the returned extent may be added to the extent result list.

At 412, the cursor may be reset to <LBA of returned extent−1, last Snapshot ID>. As discussed previously, the last snapshot ID may be the largest snapshot ID in the snapshot hierarchy (e.g., the snapshot ID of the RP). At 414, if the LBA value (e.g., first value) of the reset cursor is not within the lookup range (e.g., (LBA of returned extent−1) <start LBA of query range), then the range lookup is completed and workflow 400 may end. However, at 414, if the LBA value (e.g., first value) of the reset cursor is within the lookup range (e.g., start LBA≤(LBA of returned extent−1)<last LBA of query range), then workflow 400 may return back to 404 to begin another iteration for the new cursor value. This may ensure that all qualified extents are located and added to the extent result list before workflow 400 is completed.

Returning to 408, if the snapshot ID of the returned extent is within the deny list, then the returned extent may not be added to the extent result list. The returned extent is not added to the extent result list, and other extents containing the same LBA and within the same compressed extent maintained in the deny list are skipped. Accordingly, at 416, the extent in the deny list that contains the snapshot ID of the returned extent may be retrieved. At 418, the returned extent is not added to the extent result list. Other extents associated with snapshot IDs in the extent from the deny list and having the same LBA may be skipped (e.g., not scanned and not added to the extent result list).

At 420, the cursor may be reset to <last LBA of returned extent, starting snapshot ID of deny list extent−1>. Workflow 400 may return back to 404 to begin another iteration for the reset cursor value. This may ensure that all qualified extents are located and added to the extent result list before workflow 400 is completed.

Aspects of the present disclosure may provide a significant improvement in servicing I/Os. In particular, the proposed logical extent range lookup algorithm may be a performance-efficient solution for servicing I/Os by both (1) utilizing a space efficient deny list for a RP to filter out logical extents outside of a snapshot chain of the RP and effectively skip contiguous extents that belong to snapshots in the deny list and (2) performing the range lookup in reverse order through the ordered data structure of logical extents to allow for efficient location of qualified extents, thereby removing a need to sift through extents that are not the latest extent among those with the same LBA. Accordingly, the proposed logical extent range lookup algorithm may be useful in snapshot mapping architectures having a large number of snapshots with a short lifespan or having multiple branches of snapshots.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for reverse range lookup in an ordered data structure of keys associated with one or more snapshots in a snapshot hierarchy, wherein each key comprises a logical block address (LBA) and a snapshot identifier (ID) of one of the one or more snapshots, the method comprising:
   receiving a read request defining a range of LBAs selected for querying the ordered data structure, wherein the range of LBAs includes a start LBA and a last LBA, wherein the keys in the ordered data structure are in an order from smallest LBA to largest LBA, wherein in the order, keys having a same LBA are ordered from smallest snapshot ID to largest snapshot ID;
   traversing the ordered data structure in reverse of the order until a first key is located that:
      has a first LBA that is less than or equal to the last LBA; and
      has a first snapshot ID that is less than or equal to the largest snapshot ID among snapshot IDs of the one or more snapshots in the snapshot hierarchy;
   adding an extent corresponding to the located first key to an extent result list; and
   returning the extent result list having, at least the extent corresponding to the located first key in response to the read request.

2. The method of claim 1, further comprising, subsequent to locating the located first key:
   determining the first snapshot ID of the located first key is not within any deny list extent maintained in a deny list,
   wherein adding the extent corresponding to the located first key to the extent result list is further based on the determination that the first snapshot ID of the located first key is not within any deny list extent maintained in the deny list.

3. The method of claim 2, further comprising:
   determining an LBA value one less than the first LBA of the located first key is equal to or greater than the start LBA; and
   traversing the ordered data structure in reverse of the order to locate a second key with a second LBA less than or equal to the LBA value one less than the first LBA of the located first key and with a second snapshot ID less than or equal to the largest snapshot ID; or
   determining the LBA value one less than the first LBA of the located first key is smaller than the start LBA, wherein returning the extent result list is based on the determination that the LBA value one less than the first LBA of the located first key is smaller than the start LBA.

4. The method of claim 3, further comprising, subsequent to traversing the ordered data structure in reverse of the order to locate the second key:
locating the second key with the second LBA less than or equal to the LBA value one less than the first LBA of the located first key and with the second snapshot ID less than or equal to the largest snapshot ID;
determining the second snapshot ID of the located second key is within a snapshot deny list extent maintained in the deny list; and
traversing the ordered data structure in reverse of the order searching for a third key with a third LBA less than or equal to the second LBA of the located second key and a third snapshot ID less than or equal to one less than a starting snapshot ID of the deny list extent.

5. The method of claim 2, wherein each deny list extent maintained in the deny list corresponds to at least one snapshot ID associated with a snapshot outside a chain of a running point (RP) for the ordered data structure.

6. The method of claim 5, wherein when a deny list extent maintained in the deny list corresponds to two or more snapshot IDs associated with two or more snapshots, the deny list extent comprises a compressed extent for the two or more snapshot IDs.

7. A system comprising:
one or more processors; and
at least one memory, the one or more processors and the at least one memory configured to:
receive a read request defining a range of LBAs selected for querying an ordered data structure of keys associated with one or more snapshots in a snapshot hierarchy, wherein:
each key in the ordered data structure comprises a logical block address (LBA) and a snapshot identifier (ID) of one of the one or more snapshots,
the keys in the ordered data structure are in an order from smallest LBA to largest LBA,
in the order, keys having a same LBA are ordered from smallest snapshot ID to largest snapshot ID, and
the range of LBAs includes a start LBA and a last LBA; traverse the ordered data structure in reverse of the order until a first key is located that:
has a first LBA that is less than or equal to the last LBA; and
has a first snapshot ID that is less than or equal to the largest snapshot ID among snapshot IDs of the one or more snapshots in the snapshot hierarchy;
add an extent corresponding to the located first key to an extent result list; and
return the extent result list having, at least the extent corresponding to the located first key in response to the read request.

8. The system of claim 7, wherein the one or more processors and the at least one memory are further configured to, subsequent to locating the located first key:
determine the first snapshot ID of the located first key is not within any deny list extent maintained in a deny list, wherein the one or more processors and the at least one memory are configured to add the extent corresponding to the located first key to the extent result list further based on the determination that the first snapshot ID of the located first key is not within any deny list extent maintained in the deny list.

9. The system of claim 8, wherein the one or more processors and the at least one memory are further configured to:
determine an LBA value one less than the first LBA of the located first key is equal to or greater than the start LBA; and
traverse the ordered data structure in reverse of the order to locate a second key with a second LBA less than or equal to the LBA value one less than the first LBA of the located first key and with a second snapshot ID less than or equal to the largest snapshot ID; or
determine the LBA value one less than the first LBA of the located first key is smaller than the start LBA, wherein the one or more processors and the at least one memory are configured to return the extent result list based on the determination that the LBA value one less than the first LBA of the located first key is smaller than the start LBA.

10. The system of claim 9, wherein the one or more processors and the at least one memory are further configured to, subsequent to traversing the ordered data structure in reverse of the order to locate the second key:
locate the second key with the second LBA less than or equal to the LBA value one less than the first LBA of the located first key and with the second snapshot ID less than or equal to the largest snapshot ID;
determine the second snapshot ID of the located second key is within a snapshot deny list extent maintained in the deny list; and
traverse the ordered data structure in reverse of the order searching for a third key with a third LBA less than or equal to the second LBA of the located second key and a third snapshot ID less than or equal to one less than a starting snapshot ID of the deny list extent.

11. The system of claim 8, wherein each deny list extent maintained in the deny list corresponds to at least one snapshot ID associated with a snapshot outside a chain of a running point (RP) for the ordered data structure.

12. The system of claim 11, wherein when a deny list extent maintained in the deny list corresponds to two or more snapshot IDs associated with two or more snapshots, the deny list extent comprises a compressed extent for the two or more snapshot IDs.

13. A non-transitory computer readable medium comprising instructions that, when executed by one or more processors of a computing system, cause the computing system to perform operations for reverse range lookup in an ordered data structure of keys associated with one or more snapshots in a snapshot hierarchy, wherein each key comprises a logical block address (LBA) and a snapshot identifier (ID) of one of the one or more snapshots, the operations comprising:
receiving a read request defining a range of LBAs selected for querying the ordered data structure, wherein the range of LBAs includes a start LBA and a last LBA, wherein the keys in the ordered data structure are in an order from smallest LBA to largest LBA, wherein in the order, keys having a same LBA are ordered from smallest snapshot ID to largest snapshot ID;
traversing the ordered data structure in reverse of the order until a first key is located that:
has a first LBA that is less than or equal to the last LBA; and
has a first snapshot ID that is less than or equal to the largest snapshot ID among snapshot IDs of the one or more snapshots in the snapshot hierarchy;

adding an extent corresponding to the located first key to an extent result list; and returning the extent result list having, at least the extent corresponding to the located first key in response to the read request.

14. The non-transitory computer readable medium of claim 13, wherein the operations further comprise, subsequent to locating the located first key:

determining the first snapshot ID of the located first key is not within any deny list extent maintained in a deny list, wherein adding the extent corresponding to the located first key to the extent result list is further based on the determination that the first snapshot ID of the located first key is not within any deny list extent maintained in the deny list.

15. The non-transitory computer readable medium of claim 14, wherein the operations further comprise:

determining an LBA value one less than the first LBA of the located first key is equal to or greater than the start LBA; and traversing the ordered data structure in reverse of the order to locate a second key with a second LBA less than or equal to the LBA value one less than the first LBA of the located first key and with a second snapshot ID less than or equal to the largest snapshot ID; or determining the LBA value one less than the first LBA of the located first key is smaller than the start LBA, wherein returning the extent result list is based on the determination that the LBA value one less than the first LBA of the located first key is smaller than the start LBA.

16. The non-transitory computer readable medium of claim 15, wherein the operations further comprise, subsequent to traversing the ordered data structure in reverse of the order to locate the second key:

traversing the ordered data structure in reverse of the order searching for a third key with a third LBA less than or equal to the second LBA of the located second key and a third snapshot ID less than or equal to one less than a starting snapshot ID of the deny list extent.

17. The non-transitory computer readable medium of claim 14, wherein each deny list extent maintained in the deny list corresponds to at least one snapshot ID associated with a snapshot outside a chain of a running point (RP) for the ordered data structure.

18. The non-transitory computer readable medium of claim 14, wherein when a deny list extent maintained in the deny list corresponds to two or more snapshot IDs associated with two or more snapshots, the deny list extent comprises a compressed extent for the two or more snapshot IDs.

* * * * *